Patented Aug. 12, 1924.

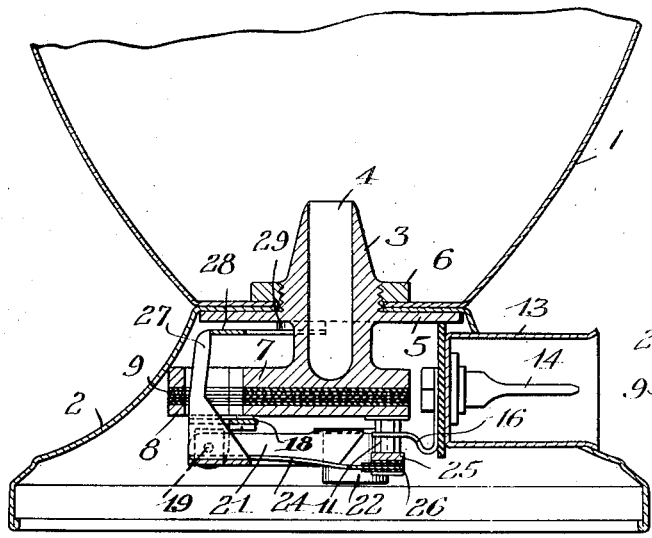

1,504,269

UNITED STATES PATENT OFFICE.

WILLIAM A. RANKIN, OF ROCHESTER, NEW YORK, ASSIGNOR TO ROBESON-ROCHESTER CORPORATION, OF ROCHESTER, NEW YORK, A CORPORATION OF NEW YORK.

THERMOSTATIC SWITCH.

Application filed October 4, 1923. Serial No. 666,487.

*To all whom it may concern:*

Be it known that I, WILLIAM A. RANKIN, a citizen of the United States, residing at Rochester, in the county of Monroe and State of New York, have invented certain new and useful Improvements in Thermostatic Switches; and I do hereby declare the following to be a full, clear, and exact description of the same, reference being had to the accompanying drawings, forming a part of this specification, and to the reference numerals marked thereon.

My present invention relates to thermostatic cut-outs for electrical heating units, and it has for its object to provide a simple and efficient thermostatic switch which may be adjusted to operate at any desired temperature and which, when the heating unit has cooled can be reset or closed in a very simple manner. To these and other ends the invention consists in certain improvements and combinations of parts, all as will be hereinafter more fully described, the novel features being pointed out in the claims at the end of the specification.

In the drawings:

Figure 1 is a fragmentary sectional view of the base of a coffee percolator provided with an electrical heating unit and with a thermostatic switch constructed in accordance with and illustrating one embodiment of my invention;

Figure 2 is a bottom plan view thereof;

Figure 3 is a fragmentary view of parts shown in Figure 1, but showing the position of the switch when open;

Figure 4 is a top plan view of the switch alone with its attaching bracket;

Figure 5 is a bottom plan view of the terminal plate with the switch removed showing the relationship of the switch detent and its thermostatic trip, and Figure 6 is a side view of the parts shown in Figure 5.

Similar reference numerals throughout the several views indicate the same parts.

In the construction of these thermostatically controlled electrical heating units adapted for use on percolators and similar vessels and culinary appliances, a cut-out switch may be employed which is actuated to open position by a spring upon its release by a thermostatic detent. Such a construction obviously requires that the spring be overcome and the switch reset by hand. Even so simple a manipulation of an apparatus of imagined complexity is often beyond the skill of the users of the apparatus. In the practice of my present invention I provide a thermostatic switch that will automatically reset itself through manipulation of the percolator or other vessel or device as a whole, preferably through inverting it as in emptying its contents or in inspecting its under side as it is natural to do when the heating element fails of operation.

Referring more particularly to the drawings in which, as before indicated I have illustrated my invention as applied to a coffee percolator, 1 indicates the percolator body or reservoir and 2 a suitable hollow brace therefor. Projecting upwardly through both is a member 3 containing the usual percolating or heating well 4. This member 3 has a flange 5 abutting the top of the interior of the base 2 and between which and the nut 6 threaded on the member 3 the body 1 and base 2 are clamped together.

Preferably cast in one piece with the member 3 is a top heating plate 7 between which and a bottom plate 8 the electrical heating unit 9 is suitably confined. The bottom plate 8 constitutes the terminal plate on which are mounted binding posts 10, 11 and 12 for supplying current to the heating element. A socket 13 suitably introduced into the base from the exterior houses the customary pair of contact fingers 14 to cooperate with a plug from which current is supplied. Ties 15 and 16 run from the respective fingers 14 to binding posts 10 and 11 while post 12 adjacent to post 11 together with post 10 constitute the terminals of the circuit of the heating element 9. Therefore while the circuit is direct at 15 the current at 16 must pass from post 11 to 12 or vice versa and it is here that the switching is done.

Secured to the under side of the plate 8 at 17 is a bracket 18 having downwardly turned bearing ears 18 to pivotally receive the trunnions 19 of a switch yoke 20. The arms 21 of this yoke carry weights 22 and secured to the yoke at 23 intermediate the arm is the spring switch arm 24. At its end this switch arm is fitted with a transverse switch plate 25 suitably insulated from the arm at 26. The switch plate 25 is adapted to contact simultaneously with the two posts 11 and 12 as shown in Figures 1 and 2. The tendency of the weights 22 however is to rock the yoke 20 and carry the switch plate out of contact to the open position of Figure 3. The switch however is normally closed which condition is maintained against the tendencies of the weight 22 by an upwardly extending finger or latch 27 on the switch yoke 20 which latch is detained by a trigger 28, as shown in Figure 1.

The detent or trigger 28 consists in the present instance merely of an upwardly yieldable leaf spring secured to the flange 5 at 29. There is similarly secured to this same flange at 30 a thermostatic leaf 31, the two intersecting angularly at their ends as shown in Figure 5 and the thermostatic leaf being below the detent. It is adapted to engage the latter on its under side through an adjustable threaded contact post 32. This thermostatic leaf 31 may be constructed in any suitable manner within the knowledge of those experienced in the art as for instance the ordinary bi-metal lamination, the object being that it shall curl upwardly at its outer end when the heat becomes excessive in the member 3 and its flange 5 at the bottom of the vessel.

The operation of the mechanism will be apparent from the above description. If the percolator boils dry or so nearly so that member 3 and its thermally intimately connected parts 5 and 7 become overheated the thermostatic leaf 31 curls upwardly into engagement with the trigger 28 which engagement is at an early or a late point with a low or a higher degree of heat according to the adjustment of the contact post 32 by means of which the cutout may be accomplished at the desired temperature. The detent or trigger 28 is thereby released from the latch 27 so that the switch yoke 20 drops by virtue of the weight 22 and the switch plate 25 on the switch arm 24 is carried to open position out of contact with the posts 11 and 12 and the circuit is broken. When the device has cooled however and the thermostatic leaf 31 has allowed the spring trigger 28 to resume its normal position, merely inverting the apparatus will cause the weights 22 to carry the switch plate 25 back into circuit closing position, and restore the latch 27 into engagement with the trigger 28 as in Figure 1 to maintain the circuit closed until again interrupted under the same conditions.

This inversion of the apparatus to reset it will, of course, be part of the instructions for the use of the apparatus, but if not understood by the user the latter is very apt to inadvertently reset and close the switch as a result of a curious inspection of the machine or the act of washing it or emptying its contents.

I have shown the bottom of the base 2 open exposing the mechanism, but in practice it would probably be closed as there is no objection to sealing it inasmuch as no manual operation of the interior parts is required.

I claim as my invention·

1. The combination with an electrical heating unit having circuit contacts, of a switch element normally closing the circuit through said contacts, a thermostatically controlled detent for maintaining the normal position of the switch and a weight tending to open the switch.

2. The combination with an electrical heating unit having circuit contacts, of a vertically movable switch element normally closing the circuit through said contacts, a thermostatically controlled detent for maintaining the normal position of the switch and a weight adapted to open the switch when the entire apparatus is in normal position and the detent is released and to re-engage the switch with the detent when the entire apparatus is inverted.

3. The combination with an electrical heating unit having circuit contacts and embodying a hot plate and a heat distributing element thermally connected therewith, of a pivoted switch element on the underside of the hot plate normally closing the circuit through said contacts and provided with a latch, a thermostatically controlled detent for the latch mounted on the heat distributing element above the hot plate and a weight on the switch element adapted to open it when the detent is released and the apparatus as a whole is in normal position and to restore the latch to engaging position with relation to the detent when the apparatus as a whole is inverted.

4. The combination with an electrical heating unit having circuit contacts and embodying a hot plate and a heat distributing element thermally connected therewith above the same, of a pivoted switch element on the under side of the hot plate normally closing the circuit through said contacts and provided with an upwardly extending latch, a spring detent finger normally engaging the latch, a thermostatic trip for the detent finger mounted on the heat distributing element, and a weight on the switch element adapted to open it when the detent is released and the apparatus as a whole is in normal position and to restore the latch to engaging position with relation to the detent when the apparatus as a whole is inverted.

5. The combination with an electrical heating unit having circuit contacts and embodying a hot plate horizontally disposed and provided with an opening and a heat distributing element thermally connected with the hot plate above the same, of a switch yoke pivoted on the under side of the hot plate and embodying a switch plate normally closing the circuit through said contact, a latch finger on the yoke extending upwardly through the opening in the hot plate, a spring detent finger normally engaging the latch, a thermostatic trip for the detent finger mounted on the heat distributing element and between it and the hot plate and a weight on the switch yoke adapted to open the switch when the detent is released and the apparatus as a whole is in normal position and to restore the latch to engaging position with relation to the detent when the apparatus as a whole is inverted.

WILLIAM A. RANKIN.